United States Patent [19]

Veraart

[11] Patent Number: 5,672,098
[45] Date of Patent: Sep. 30, 1997

[54] APPARATUS FOR TRANSFERRING SLAUGHTERED POULTRY FROM A FIRST SUSPENSION CONVEYER TOWARDS A SECOND SUSPENSION CONVEYER

[75] Inventor: Antonius Jozef Veraart, Oostzaan, Netherlands

[73] Assignee: Machinefabriek Meyn B.V., Oostzaan, Netherlands

[21] Appl. No.: 623,467

[22] Filed: Mar. 28, 1996

[30] Foreign Application Priority Data

Apr. 4, 1995 [NL] Netherlands .................. 1000029

[51] Int. Cl.⁶ .................................................. A22C 18/00
[52] U.S. Cl. ............................................. 452/182; 452/183
[58] Field of Search ................................. 452/182, 183

[56] References Cited

U.S. PATENT DOCUMENTS

| | | | |
|---|---|---|---|
| 4,791,704 | 12/1988 | Chapman | 452/182 |
| 4,813,101 | 3/1989 | Brakels et al. | 452/182 |
| 5,125,498 | 6/1992 | Meyn | 452/182 |
| 5,277,650 | 1/1994 | Meyn | 452/182 |
| 5,453,045 | 9/1995 | Hobbel et al. | 452/182 |

*Primary Examiner*—Willis Little
*Attorney, Agent, or Firm*—Dority & Manning

[57] ABSTRACT

The invention relates to an apparatus for transferring slaughtered poultry from a first suspension conveyor towards a second suspension conveyor, having a supply station contiguous with the first suspension conveyor and a discharge station contiguous with the second suspension conveyor. The device included a transfer unit positioned between the two suspension conveyors, the transfer unit being provided with a receiving station which is drivable in synchronization with the supply station and with a delivery station which is drivable in synchronization with the discharge station and further with a transfer track connecting the receiving station with the delivery station and vice versa, the track including a transfer mechanism movable there along with carriers for the poultry. The transfer track has a roundgoing support onto which the transfer mechanism is mounted such that in a not obstructed situation the transfer mechanism does not carry out a relative movement in respect to the support, but can move relative to the support when in an obstructed situation.

10 Claims, 3 Drawing Sheets

APPARATUS FOR TRANSFERRING SLAUGHTERED POULTRY FROM A FIRST SUSPENSION CONVEYER TOWARDS A SECOND SUSPENSION CONVEYER

BACKGROUND OF THE INVENTION

The present invention relates to an apparatus for transferring slaughtered poultry from a first suspension conveyor towards a second suspension conveyor, comprising a supply station contiguous with the first suspension conveyor and a discharge station contiguous with the second suspension conveyor and comprising a transfer unit positioned between the two suspension conveyors, said transfer unit provided with a receiving station which is drivable in synchronization with the supply station and with a delivery station which is drivable in synchronization with the discharge station and further with a transfer track connecting the receiving station with the delivery station and vice versa, the track comprising transfer means movable there along with carriers for the poultry.

A prior apparatus is known from European patent specification 155.014. Basically, such a known apparatus operates in the following way. At the receiving station as well as at the delivery station the transfer means, which comprise carriers for the poultry, move in synchronization with the passing suspension hooks of the first suspension conveyor and the second suspension conveyor, respectively. Thus, it is possible that the poultry which with its legs is suspended from the first suspension conveyor, at the supply station and in the receiving station is transferred towards the transfer means, in such a way that the poultry with its legs will be suspended in the carriers thereof. At the delivery station, the opposite occurs such that at that location the poultry is transferred towards the suspension hooks of the second suspension conveyor which at that moment are present in the discharge station. Finally, the poultry is discharged by means of the second suspension conveyor.

Such an apparatus, also indicated as a buffer transfer device, is mainly meant for connecting two suspension conveyors of which the conveying velocities do not always fully correspond. If, for example, the velocity of the first suspension conveyor is temporarily higher than the velocity of the second suspension conveyor a small amount (buffer amount) of transfer means will be created on the transfer unit between the receiving station and the delivery station. When the velocity of the second suspension conveyor increases relative to the velocity of the first suspension conveyor (or even exceeds it) this amount is used to compensate for the difference in velocity.

It will be clear that for a proper operation of such an apparatus a sufficiently large number of transfer means should be present between the receiving station and delivery station or between the delivery station and the receiving station, respectively.

OBJECTS AND SUMMARY OF THE INVENTION

It is an object of the invention to provide an apparatus of the type discussed of which the applications are increased. Additional objects and advantages of the invention will be set forth in part in the following description, or may be obvious from the description, or may be learned through practice of the invention.

Thus, the apparatus according to the invention is characterized in that the transfer track comprises a roundgoing support onto which the transfer means are mounted such that in a not obstructed situation the transfer means do not carry out a relative movement with respect to the support but can move relative to the support when in an obstructed situation.

In the so-called not obstructed situation, the transfer means move along with the roundgoing support such that between these no relative movement occurs. This means that the transfer means (and more important, the poultry supported thereby) are fully stationary relative to the roundgoing support, such that no undesired vibrations are introduced into the transfer means (or poultry, respectively). As a result, it specifically becomes possible to conduct measurements of the poultry which are not disturbed by undesired influences. Among others, one can imagine the measurement of the weight of the poultry.

In a preferred embodiment of the apparatus according to the invention, the support is a rotating disc. Generally the receiving station and delivery station, as is already known from the mentioned European patent specification 155.014, will comprise a rotating carousel or alike of which the diameter is considerably smaller than the diameter of the rotating disc and which is positioned within the boundary of the rotating disc and of which the circumference basically is tangent to the circumference of the rotating disc.

In such a case, it is further preferred that the transfer means are mounted onto the circumference of the disc. Such a construction offers an optimal accessibility of the transfer means, such that applying the poultry in or removing it from, respectively, the carriers may be realized without difficulty.

In this respect, an embodiment of the apparatus according to the invention is mentioned according to which the transfer means comprise a core member contacting the support and an operative member which, loaded by gravity, is movable upwards and downwards relative thereto. The operative member supports the carriers for the poultry as well as an abutment for cooperation with a weighing means. Using the core member, each transfer means engages the support, more specifically the rotating disc. Under influence of gravity, the operative member normally is positioned in a low position. When the transfer means, while rotating along with the disc, reaches the weighing means the abutment will engage the weighing means and will lift the operative member against the force of gravity. The weight of the operative member is known such that as a result, using the weighing means the weight of the poultry suspended from the operative member can be determined. This weighing process is hardly disturbed because at the moment of weighing the respective transfer means is stationary relative to the rotating disc (or in more general terms the roundgoing disc).

In this respect, it is constructively preferred that the abutment is a wheel and that the weighing means is provided with a guide engaging below the wheel. The cooperation between the wheel and the guide of the weighing means results in the fact that the unavoidable relative movement between the operative member and the weighing means occurs extremely smoothly, such that disturbances of the weighing process caused thereby are minimized. In practice, it appears that, in this manner, the weight of the poultry can be determined very precisely, also at the line velocities which are common with such apparatus.

According to a specific embodiment, the operative member comprises two substantially horizontally extending pivot members which, with a first end, are hingedly connected to the core member, wherein each respective other end is hingedly connected to a substantially vertically extending connection member supporting the carriers and the abutment. For determining the weight of the poultry, the substantially vertically extending Connection member only needs to be lifted over a very small distance. During this lifting, the connection member hardly experiences any horizontal displacement such that the poultry suspending from the operative member neither is displaced in horizontal direction and thus will remain suspended calmly. This is favorable for the measurement precision while weighing.

Finally, an embodiment of the apparatus according to the invention is mentioned comprising obstruction means positioned ahead of the receiving station or delivery station, respectively, for temporarily obstructing and at appropriate moments releasing the transfer means. The obstruction means withhold a series of waiting transfer means until the appropriate moment has come for supplying one of these to the receiving station or delivery station, respectively. Like this, one can avoid that the transfer means will get stuck at the receiving station or delivery station.

Hereinafter the invention will be elucidated referring to the drawing in which an embodiment of the apparatus according to the invention is illustrated.

DETAILED DESCRIPTION OF THE PREFERRED EMBODIMENT

Figure 1:
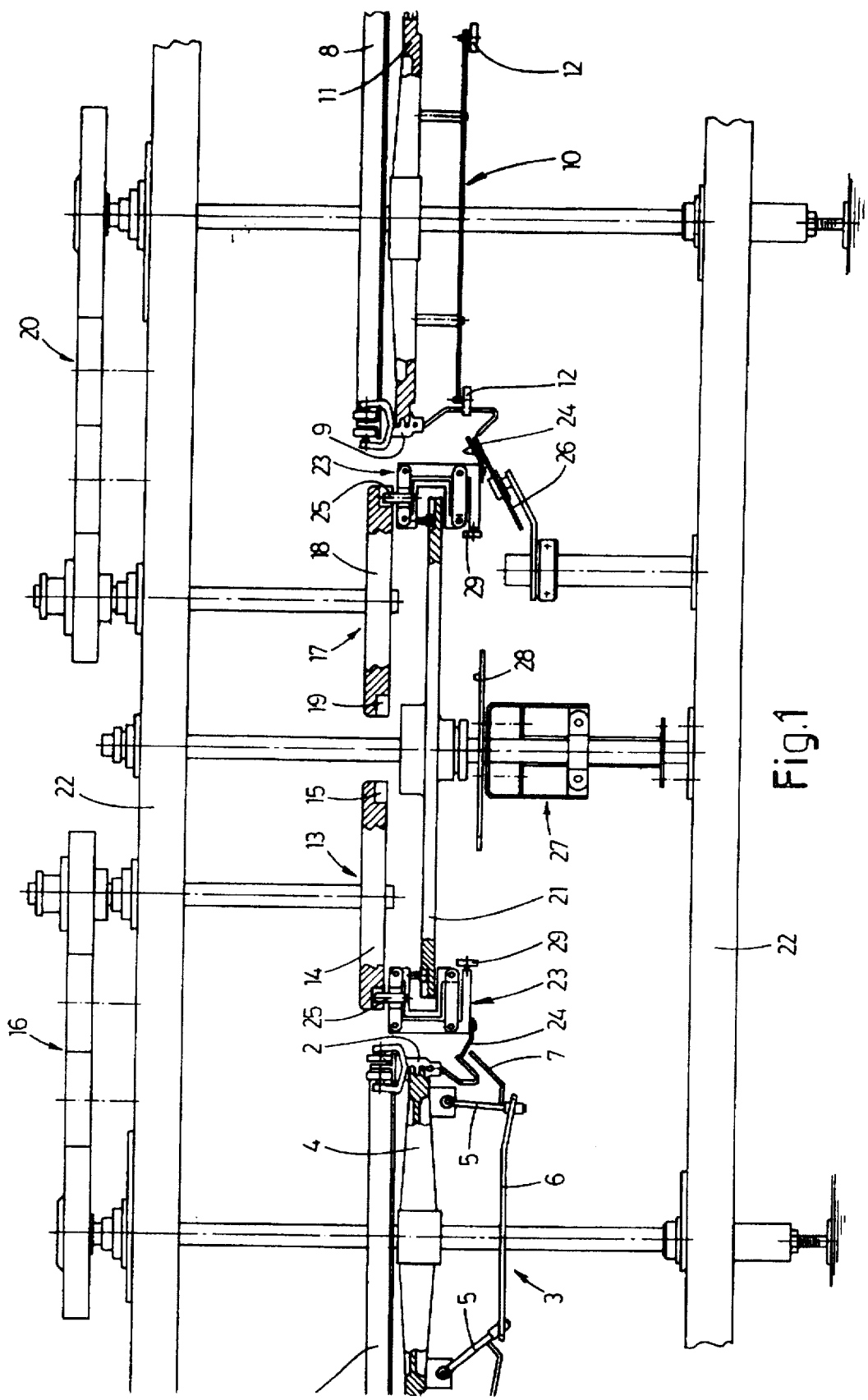
FIG. 1 shows schematically and partially cut away a side elevational view of an embodiment of the apparatus according to the invention.

Reference will now be made in detail to the presently preferred embodiments of the invention, one or more examples of which are illustrated in the drawings. Each example is provided by way of explanation of the invention, and not as a limitation of the invention. For example, features illustrated or described as part of one embodiment can be used on another embodiment to yield a still further embodiment. Also, the numbering of components is consistent throughout the description and drawings, with the same component having the same number throughout.

Figure 2:
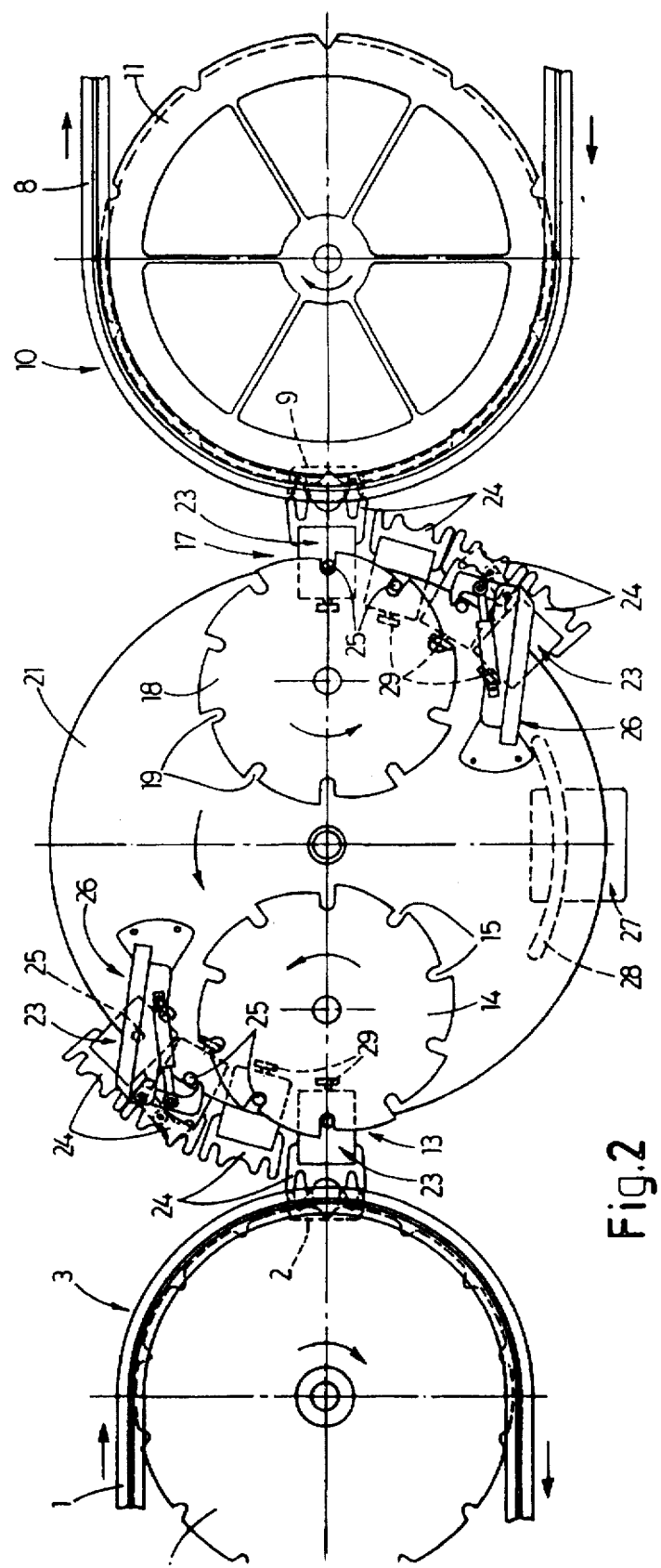
FIG. 2 shows the apparatus of FIG. 1 in a top plan view, wherein only the elements essential for comprehension of the apparatus are illustrated.

Referring to FIGS. 1 and 2, a first suspension conveyor 1 is visible which is provided with suspension hooks 2 for slaughtered poultry. Such a suspension conveyor is known per se and does not need any further explanation. This first suspension conveyor 2 passes a supply station 3 which is also known per se and, which in the illustrated embodiment (to put it briefly), comprises a disc 4 rotating in synchronization with the suspension conveyor 1 and supporting pairs of pivotable ejectors 5. The ejectors 5 can cooperate with a stationary curved track 6, such that at an appropriate moment ejector fingers 7 supported by the ejectors 5 eject both legs of the poultry from the suspension hook 2.

In a corresponding way, at the opposite side of the apparatus, there is provided a second suspension conveyor 8 with suspension hooks 9. This second suspension conveyor 8 passes a discharge station 10 which substantially comprises a disc 11 rotating in synchronization with the second suspension conveyor 8. Disc 11 comprises circumferential recesses and carries circumferential abutments 12 which can cooperate with the suspension hooks 9 of the second suspension conveyor 8, such that these have a stable position in the discharge station 10.

Between both suspension conveyors 1 and 8 there is provided a transfer unit which, at one side, is provided with a receiving station drivable in synchronization with the supply station 3. This receiving station 13 substantially comprises a rotating disc 14 having recesses 15 distributed regularly at or near to its circumference.

The synchronization between the rotation of the disc 4 of the supply station 3 and the disc 14 of the receiving station 13 occurs through a transmission device 16.

The transfer unit further comprises a delivery station 17 drivable in synchronization with the discharge station 10. Delivery station 17 also substantially comprises a rotating disc 18 with regularly distributed recesses 19. Through a transmission device 20, disc 18 is connected to the disc 11 of the discharge station 10.

The transfer unit further is provided with a rotation disc 21 which, as is the case also with the other parts of the apparatus, is mounted in a frame 22.

The rotating disc 21 defines a transfer track connecting the receiving station 13 with the delivery station 17 and vice versa, along which track transfer means 23 move. The construction of transfer means 23 will be elucidated later referring to FIG. 3. Now it is sufficient to note that these transfer means 23 are provided with carriers 24 for receiving the legs of the slaughtered poultry. Further, at their top, the transfer means 23 are provided with a propulsion pin 25 which can be received in one of the recesses 15 or 19 of the disc 14 or 18, respectively.

As has been noted already, disc 14 of the receiving station is synchronized with disc 4 of the supply station 3, and thus with the suspension hooks 2 of the first suspension conveyor 1. Thus, due to the cooperation between the propulsion pins 25 of the transfer means 23 and the recesses 15 of disc 14, the carriers 24 will move in synchronization with the suspension hooks 2 of the first suspension conveyor 1. As a result, the legs of the poultry removed from the suspension hooks 2 by means of the ejection fingers 7 can be received directly by the carriers 24 of a transfer means 23, as has been indicated on the left in FIG. 1.

A corresponding synchronized cooperation occurs at the delivery station 17 and discharge station 10, such that the carriers 24 of the transfer means 23 will pass in synchronization with the suspension hooks 9 of the second suspension conveyor 8. In this manner, the legs of the poultry can be transferred towards the suspension hook 9 of the second suspension conveyor 8 by an only schematically indicated ejection member 26 (for example shaped as a rotation disc), which hook is exactly at that spot at that very moment.

For a good comprehension of the operation of the apparatus, the directions of movement and rotation of several parts have been indicated by arrows in FIG. 2.

Ahead of the receiving station 13 and delivery station 17, respectively, obstruction means 26 (not indicated in FIG. 1) are positioned which can engage the propulsion pins 25 of the transfer means 23. The obstruction means 26 obstruct transfer means 23 waiting in a buffer series and allow them to pass one at a time at appropriate moments for reaching the discs 14 and 18, respectively, of the receiving station 13 and delivery station 17, respectively. Like this, it can be avoided that an incorrect cooperation occurs between the propulsion pins 25 and the recesses 15 and 19, respectively, which could lead to blocking the apparatus.

Although in the illustrated embodiment the obstruction means 26 are shown as arms comprising a pivotable hooked member, of course several different embodiments are conceivable.

For a correct operation of the illustrated apparatus, the rotational velocity of the disc 1, as is known generally, needs to be that high that the transport velocity of the transfer means 23 on the disc 21 is higher than the line velocity of the suspension conveyors. As a result, it can be guaranteed permanently that a buffer supply of transfer means 23 is present at the obstruction means 26.

Below the rotating disc 21, a weighing device 27 is provided with a weighing plate 28. The transfer means 23 are provided with wheels 29 (which, as will appear later in respect of FIG. 3, are connected with the carriers 24) which can cooperate with the weighing plate 28, such that the weight of the poultry suspended from the carriers 24 can be determined.

Figure 3:
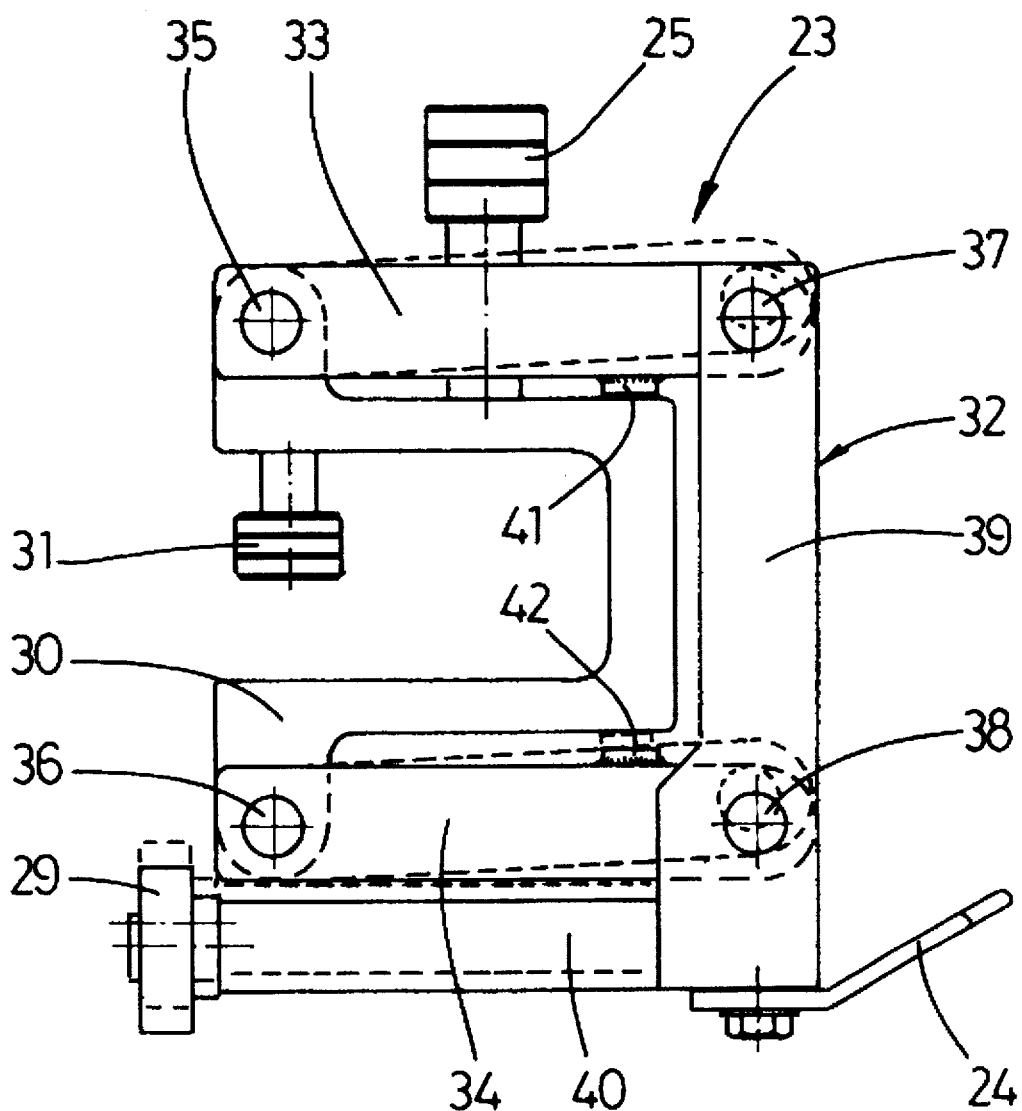
FIG. 3 shows in a side elevational view and on a larger scale schematically a transfer means applied at the apparatus.

Referring now to FIG. 3, schematically and in a side elevational view a transfer means 23 is visible. This transfer means comprises a core member 30 meant for engagement with the rotating disc 21. For its guiding relative to and its attachment to said disc 21 the core member 30 comprises guiding rollers or alike of which only one has been schematically indicated as 31 in FIG. 3. An operative member 32 is mounted onto core member 30 and is in a limited way movable upwards and downwards relative to the core member 30. In the illustrated embodiment, the operative member comprises two substantially horizontally extending pivot members 33, 34 which with a first end are connected to the core member 30 at hinges 35, 36. At the opposite ends of the pivot member 33, 34 a substantially vertically extending connection member 39 is coupled through hinges 37, 38. At its lower side connection member 39 supports the carriers 24 and, through a coupling member 40, the wheel 29.

The construction defined by the pivot members 33, 34 and the connection member 39 can restrictedly move upwards and downwards relative to the core member 30. The amount of upward and downward motion is determined by two abutments 41, 42.

In a first position of the operative member 32, the wheel 29 not being supported, the abutment 41 rests upon the core member 30. When the wheel 29 reaches the weighing plate 28 of the weighing device 27, the operative member 32 is slightly lifted, such that the weight of the poultry, being suspended from the carriers 24, can be determined. Of course the abutment 42 should be free from the core member 30 during weighing.

At the moment of weighing, the transfer means 23 moves along with the rotating disc 21 such that between both members no relative velocity occurs. As a result the weighing occurs very precisely. When the transfer means 23 reaches one of the obstruction means 26, the transfer means is withheld and the disc 21 will rotate relative to the transfer means. Only when an obstruction means 26 releases the transfer means it will again move along together with the disc 21 and reach one of the discs 14 or 18, respectively, where, due to the cooperation between the propulsion pin 25 and one of the recesses 15 or 19, respectively, the correct velocity of the transfer means is determined for enabling the reception of poultry from the first suspension conveyor 1 or the delivery towards the second suspension conveyor 8, respectively. At this stage again a differential velocity, although smaller, will occur between the rotating disc 21 and the transfer means 23 (specifically the disc 21 will generally move slightly quicker than the transfer means).

The apparatus illustrated and described before enables, apart from the buffering action, to carry out other operations too, such as weighing the poultry to be transferred.

The invention is not limited to the embodiment described above which can be varied widely within the scope of the invention as defined by the claims and their equivalents.

I claim:

1. An apparatus for transferring poultry from a first conveyor device to a second conveyor device wherein the conveying velocities of the first and second conveyor devices may vary, comprising:

a first conveyor device and a supply station contiguous with and driven in synchronization with said first conveyor device;

a second conveyor device and a discharge station contiguous with and driven in synchronization with said second conveyor device;

a transfer unit operably disposed between said first suspension conveyor and said second suspension conveyor for transferring poultry from said first conveyor device and said supply station to said discharge station and said second conveyor device, said transfer unit further comprising a receiving station driven in synchronization with said supply station, and a delivery station driven in synchronization with said discharge station, said transfer unit further comprising a transfer track connecting said receiving station and said delivery station;

transfer devices configured with said transfer unit and movable along said transfer track between said receiving station and said delivery station, said transfer device comprising poultry carrier devices;

said transfer unit comprising a moving transfer support defining said transfer track, said transfer devices carried by said transfer support; and a non-obstructed portion defined along said transfer track wherein said transfer support drivingly engages with said transfer devices so that there is substantially no relative movement between said transfer devices and said transfer support, and an obstructed portion defined along said transfer track comprising an obstructing device configured to drivingly disengage said transfer support from said transfer devices so that there is relative movement between said transfer devices and said transfer support.

2. The apparatus as in claim 1, wherein said transfer support comprises a rotating disc operably disposed between said first and second conveyor devices.

3. The apparatus as in claim 2, wherein said transfer devices are mounted on the circumference of said rotating disc.

4. The apparatus as in claim 1, wherein said supply station and said receiving station comprise rotating discs which are driven in synchronization through a transmission device, said discharge station and said delivery station comprising rotating discs which are driven in synchronization through a transmission device.

5. The apparatus as in claim 4, further comprising means configured at said supply station and said receiving station for transferring poultry from said first conveyor device to said transfer devices, and means configured at said discharge station and said delivery station for transferring poultry from said transfer devices to said second conveyor device.

6. The apparatus as in claim 1, wherein said obstructed portion further defines a buffer section for transfer devices waiting to be engaged by said receiving station.

7. The apparatus as in claim 6, wherein said transfer devices comprise pins engaging in recesses defined in said transfer support, said obstruction device comprises a mechanical member disengaging said pins from said recesses.

8. The apparatus as in claim 1, wherein said transfer devices further comprise a weighing mechanism configured to weigh poultry carried thereby.

9. The apparatus as in claim 8, wherein said transfer devices comprise a core member contacting said transfer support, and an operative member movable upwards and downwards relative to said transfer support, said operative member supporting said poultry carrier devices and comprising an engaging member contacting a weighing plate of a weighing device for weighing the poultry.

10. The apparatus as in claim 9, wherein said engaging member comprises a wheel.

* * * * *

UNITED STATES PATENT AND TRADEMARK OFFICE
CERTIFICATE OF CORRECTION

PATENT NO. : 5,672,098

DATED : SEPTEMBER 30, 1997

INVENTOR(S) : VERAART

Page 1 of 2

It is certified that error appears in the above-identified patent and that said Letters Patent is hereby corrected as shown below:

On the title page item [56],

IN THE REFERENCES CITED SECTION

Please add the following references cited during prosecution of the application but not included in the issued patent:

U.S. PATENT DOCUMENTS

| | | |
|---|---|---|
| De Greef | 4,856,144 | 8/1989 |
| Meyn | 4,574,428 | 3/1986 |
| Simonds | 4,178,659 | 12/1979 |
| Minderman et al. | 5,340,351 | 8/1994 |
| Bishop | 2,153,071 | 4/1939 |
| Hazenbroek | 5,344,360 | 9/1994 |

UNITED STATES PATENT AND TRADEMARK OFFICE
CERTIFICATE OF CORRECTION

PATENT NO. : 5,672,098
DATED : SEPTEMBER 30, 1997
INVENTOR(S) : VERAART

It is certified that error appears in the above-identified patent and that said Letters Patent is hereby corrected as shown below:

FOREIGN PATENT DOCUMENTS

| | | |
|---|---|---|
| EPO | 0 235 106 | 9/1987 |
| EPO | 0 225 306 | 6/1987 |
| EPO | 0 095 809 | 12/1983 |
| EPO | 0 259 920 | 3/1988 |
| EPO | 0 155 014 | 9/1985 |
| France | 2 606 596 | 5/1988 |

OTHER DOCUMENTS

Netherlands Search Report

Signed and Sealed this

Twenty-ninth Day of February, 2000

Attest:

Q. TODD DICKINSON

*Attesting Officer*          *Commissioner of Patents and Trademarks*